United States Patent [19]
Kelly

[11] Patent Number: 5,768,794
[45] Date of Patent: Jun. 23, 1998

[54] ELECTRONIC DATA RECORDING TAPER GAUGE

[75] Inventor: Michael W. Kelly, Joliet, Ill.

[73] Assignee: Power House Tool, Inc., Joliet, Ill.

[21] Appl. No.: 678,817

[22] Filed: Jul. 12, 1996

[51] Int. Cl.⁶ .................................................. G01B 7/13
[52] U.S. Cl. .............................. 33/531; 33/544.4; 33/542
[58] Field of Search ................................. 33/531, 544.4, 33/501.6, 504, 542

[56] References Cited

U.S. PATENT DOCUMENTS

| 2,786,277 | 3/1957 | Zifferer | 33/544.4 |
| 3,621,581 | 11/1971 | Moseman | 33/544.4 |
| 4,112,355 | 9/1978 | Gibson, Jr. et al. | 33/501.6 |
| 4,964,222 | 10/1990 | Keener | 33/544.4 |
| 5,551,162 | 9/1996 | Struble | 33/544.4 |

FOREIGN PATENT DOCUMENTS

| 1091817 | 4/1955 | France | 33/544.4 |
| 42410 | 10/1969 | U.S.S.R. | 33/544.4 |
| 1024695 | 6/1983 | U.S.S.R. | 33/544.4 |

OTHER PUBLICATIONS

"DIGIRULER", Sony Catalog No. 311, 2 pages, 1993.
"DIGIRULER", Sony Catalog No. 404, 4 pages, 1995.
"GageWay III", MicroRidge Systems, 1 page. (Date Unknown).

Primary Examiner—Christopher W. Fulton
Attorney, Agent, or Firm—Hill & Simpson

[57] ABSTRACT

An electronic taper gauge system provides an elongate taper gauge member having a free end for insertion into a gap to be measured and a movable stop member for defining an insertion distance of the elongate member into the gap. Arranged between the movable stop member and the elongate member is a position sensor which emits a position signal to a conversion device which converts the position signal into a lateral dimension signal of the taper gauge. The conversion device transmits the lateral dimension signal to a data storage device for recording the gap dimension.

20 Claims, 2 Drawing Sheets

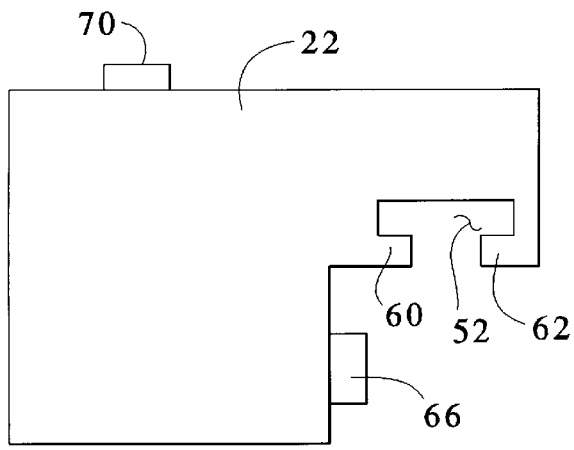
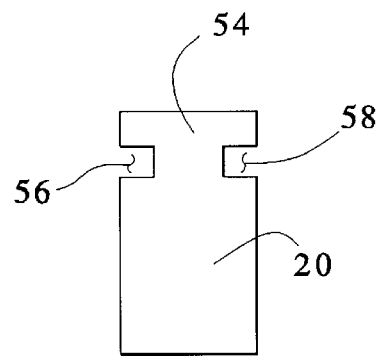
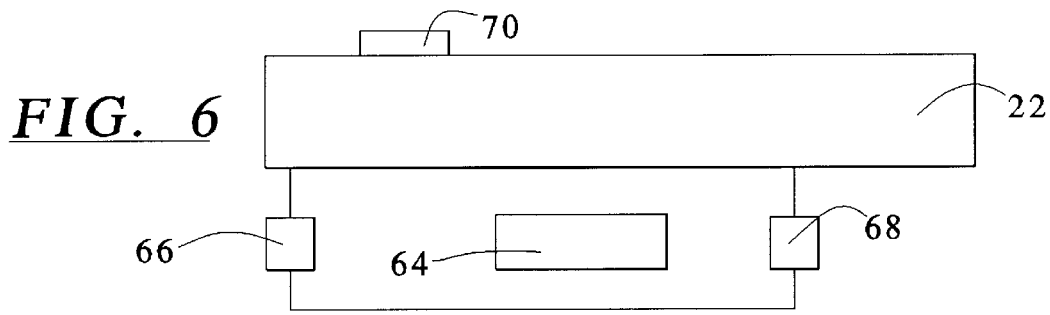
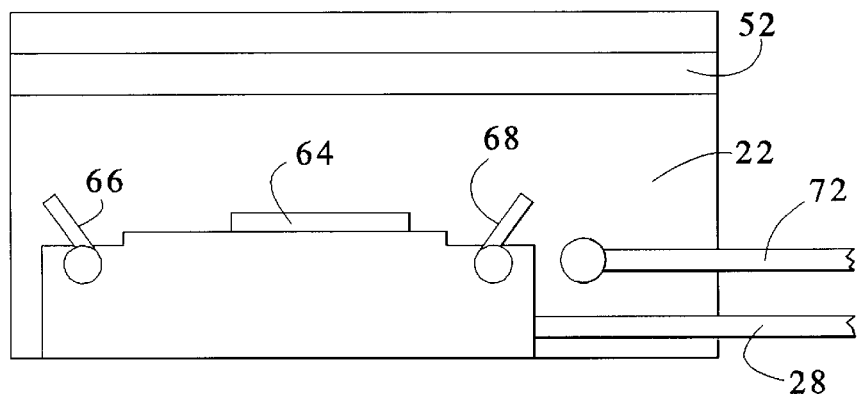
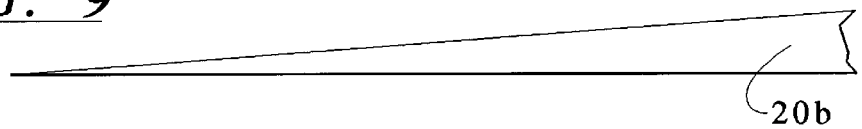

ELECTRONIC DATA RECORDING TAPER GAUGE

BACKGROUND OF THE INVENTION

The present invention is directed to taper gauges and more particularly to an electronic taper gauge in which a dimensional reading can be electronically recorded.

Mechanical taper gauges are known devices which consist of an elongated member which is tapered along its length so as to be insertable into a space having an interior dimension to be measured. The gauge is inserted into the space until it can no longer be inserted due to the increasing thickness of the gauge striking the sides of the space to be measured, usually between two objects. Then a sliding device carried on the gauge is moved up to engage with the object defining the space. A visible scale on the taper gauge is then consulted to determine a thickness of the gauge at the point at which the slide has stopped and has engaged the object defining the opening.

The scales carried on the taper gauges require writing thereon of sufficiently large size so as be readily visible in factory and power plant conditions which do not always have the best lighting conditions and which include environments causing the taper gauge scale to become dirty and hard to read. Therefore, the markings on the gauges typically are spaced apart to provide adjacent readings differing by at least five thousandths of an inch. Therefore, if the slide member is stopped in between markings on the scale, the operator is required to estimate the position of the slide, and to therefore estimate the reading made by the taper gauge.

Typically the taper gauges are used by one person who does the inserting and reading and that person then orally instructs a person who hand records the readings onto a piece of paper. This paper is then turned over to a third person who enters the information into some useable form, including entry into a computer data base. Thus, inaccuracies can result firstly in the first person reading and estimating the scale and orally transmitting it to the second person, secondly in the second person understanding and accurately recording the information, and thirdly in the third person reading the hand written entries and properly transcribing them into a computer or other useable form.

Not only are there many sources of inaccuracies, but also the reading and recording of this information is labor intensive and time consuming.

Electronic gauges such as caliper type gauges giving direct readings are known in which an electronic data string is output from the gauge. Also, digital scales or rulers are known in which a slidable member can provide a digital output signal identifying the position of the slide unit relative to the scale.

Both of these types of direct reading devices merely provide a reading of the position of a slide unit or the open dimension of a pair of measuring jaws, but do not provide the necessary conversion of a length position to a thickness dimension as represented by a different dimension on the measuring device, such as utilized in a taper gauge.

SUMMARY OF THE INVENTION

It is an object of the present invention to provide a taper gauge which operates to provide an electronic reading signal indicative of a thickness of a lateral dimension of the taper gauge based upon a sensed or read longitudinal position of a sliding member on the gauge.

It is further an object of the invention to provide an arrangement for transmitting a read position signal to a converting device to convert the longitudinal position reading to a lateral dimensional signal.

It is a further object of the invention to provide an arrangement for transmitting the lateral dimension signal to a data storage device and to a display device.

To provide these objects, there is provided a taper gauge comprising an elongated member which diminishes in at least one lateral dimension along its length. Such a taper gauge could be straight along its length or could be curved along its length. If curved, the tapering dimension could be that which is a radial dimension as viewed from the radius of curvature, or could be tapered in a direction perpendicular to this radial direction.

A movable stop member is carried on the taper gauge and is movable along the length of the gauge such that it can abut with an object which defines at least one side of a space to be dimensionally measured. The stop member might include an elongated finger projecting therefrom in the event that the object has certain constricted areas within which the measurements to be made which will not accommodate the full dimensions of the stop member. The taper gauge has readable information positioned along at least a portion of the length, for example, a magnetic strip. A reading device is carried on the stop member to read the information on the taper gauge and to generate a first signal indicating at least a portion of the read information. A conversion device is provided to convert the first signal into a second signal indicating a lateral dimension of the taper gauge at a point dependent on the position of the stop member on the taper gauge. A transmission arrangement is provided for transmitting the first signal from the reading device to the conversion device.

There may also be provide a data storage device for storing the second signal as data and a second transmission arrangement for transmitting the second signal to the data storage device. Also, an actuatable switch may be provided for sending a third signal to effect a recording of at least one of the signals at the data storage device.

BRIEF DESCRIPTION OF THE DRAWINGS

FIG. 4 is an end view of a movable stop member to be carried on the taper gauge.

FIG. 5 is an end view of the taper gauge.

FIG. 6 is a side elevational view of the movable stop member of FIG. 4.

FIG. 7 is a bottom elevational view of the movable stop member of FIG. 4.

FIG. 9 is a top view of an alternative embodiment of the taper gauge.

FIG. 10 is a side view of the taper gauge of FIG. 9.

DETAILED DESCRIPTION OF THE PREFERRED EMBODIMENTS

Figure 1:
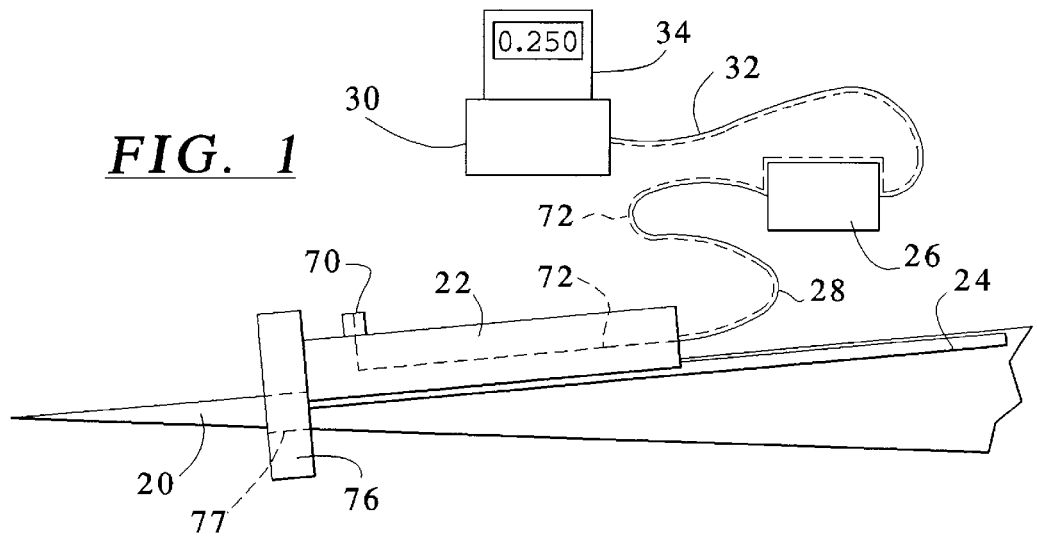
FIG. 1 is a side elevational schematic view of the electronic data recording taper gauge of the present invention.

FIG. 1 illustrates schematically the elements embodying the present invention. In this figure there is shown a taper gauge generally at 20 which comprises an elongated member diminishing and at least one lateral dimension along its length. As seen in this figure, the taper gauge tapers towards the left in this side view. Thus, the thickness of the gauge diminishes along the length. Carried on the taper gauge 20 is a movable stop member 22. This movable stop member is movable along the length of the taper gauge 20 as will be described in more detail below. An area containing information 24 is arranged on the taper gauge 20 and the movable stop member 22 carries a reading device as shown and described below which will read the information 24 and will generate a first signal indicating at least a portion of the read information. A conversion device 26 is provided for converting the first signal into a second signal indicating a lateral dimension (here the thickness) of the taper gauge at a point dependent on the then current position of the stop member 22 on a taper gauge 20. A transmission arrangement 28, here schematically shown as a cable, but which could include other types of transmission devices including radio transmitters and receivers, infrared transmitters and receivers, etc. is provided to transmit the first signal from the reading device to the conversion device.

A data storage device 30 which may preferably be in the form of a computer such as a notebook or personal computer is provided for storing the second signal as data. A second transmission arrangement 32 which again is schematically shown as a cable, but which could include other types of transmission arrangements, including transmission by those alternatives described above as well as by fixed media such as floppy disks, is provided to transmit the second signal to the data storage device. The data storage device records the second signal as a data point in an allocated memory location. Also illustrated is a display device 34 which could include any type of computer display including a CRT or LCD screen.

Figure 2:
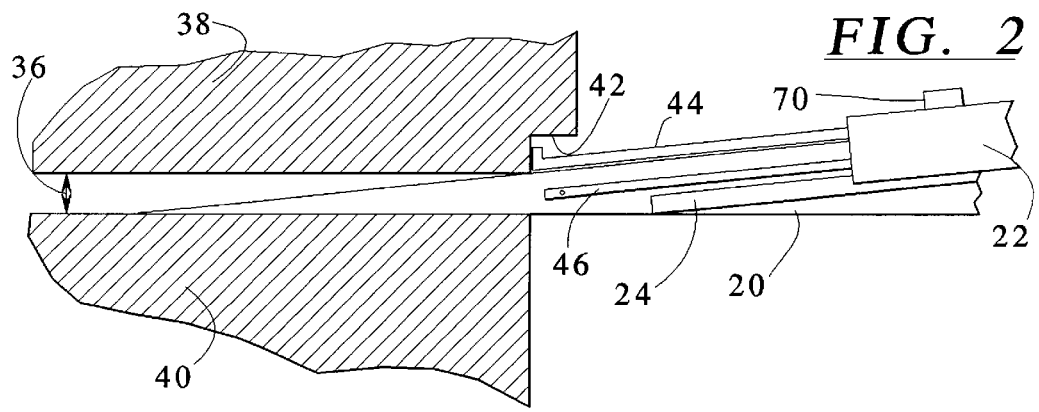
FIG. 2 is an enlarged partial side elevational view of the gauge of FIG. 1.
Figure 3:
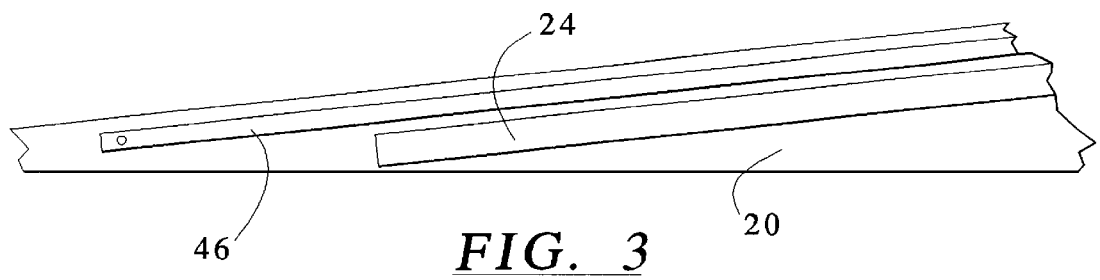
FIG. 3 is a side elevational view of a portion of the gauge of FIG. 1.

A portion of the taper gauge 20 is illustrated in greater detail in FIG. 2, where it is seen that the taper gauge 20 is being used to measure the size of a gap 36 between a first object 38 and a second object 40 which define the gap. The taper gauge 20 is inserted, narrow end first, into the gap 36 until the gauge can be inserted no further due to engagement by the sides of the taper gauge 20 with the sidewalls of the two objects 38, 40 defining the gap. At this point the movable stop member 22 is pushed toward the objects 38, 40 until it abuts against the objects. In some situations, such as shown here, one of the objects 38 has an overhang area 42 which would prevent the full size of the stop member 22 from moving to the point of engagement by the taper gauge 20. Therefore, an elongated and thin finger 44 may be provided on the stop gauge 22 to engage against the object 38 directly at the point where the taper gauge 22 engages the objects.

The stop member 22 is shown in more detail in FIGS. 4, 6 and 7 and it is seen that the slide member has a recess area 52 for receiving a complimentarily shaped area 54 on the taper gauge 20 (see FIG. 5). A pair of opposed grooves 56, 58 are provided on the taper gauge 20 and which receive flanges 60, 62 on the stop member so that the stop member will be slidingly guided along the taper gauge. The stop member 22 carries a reading device 64 which is positioned to overlay the information area 24 carried on the taper gauge. The information area 24 may be in the form of a magnetic strip, in which case, the reading device 64 would be a magnetic read head. This reading device 64 provides a first signal indicative of the read information and this first signal is sent on the transmission arrangement 28 to the conversion device 26 shown in FIG. 1.

In the embodiment illustrated in FIGS. 4, 6 and 7, the stop member includes a pair of resilient fingers 66, 68 which will hold the reading device 64 at the appropriate spacing relative to the information area 24. A switch actuatable by a button 70 or a plurality of switches actuatable by a plurality of buttons, can be carried on the stop member 22 and used to provide a third signal along a transmission arrangement 72, for example through the transmission arrangements 28, 32, or a separate cable, to effect a recording of at least one of the secondary signals at the data recording device 30.

A calibration stop device or "test piece" 76 (shown in FIG. 1) having a hole 77 therethrough of a known dimension, can be slid onto the taper gauge to a point of engagement with the taper gauge. In a calibration mode, the stop member 22 can then be pushed up against the test piece 76 and the button 70 or other designated button is then depressed to select a reading and to initiate and calibrate the readings by the gauge. In the example shown in FIG. 1, a reading of 0.250" is displayed. Thereafter, all readings made by the reading device 64 can be adjusted by the conversion device 26 or within the software provided in the computer 30 to calibrate all other readings from the initiated reading using the test piece.

Subsequently, when the taper gauge is inserted into a gap, such as gap 36 shown in FIG. 2, the button 70 may be depressed to "capture" the reading at the then current position of the stop member on the taper gauge and that reading will then be recorded at the data storage device 30.

The button 70 can be used to instigate calibration of the conversion device 26 and/or software of the computer and thereafter instigate recording of data by coordinated actuation of a single button such as holding the button down for a predetermined time for a calibration reading and a shorter time for a normal (actual) reading/recordation. Alternately, the single button 70 can be pushed multiple times rapidly for a calibration reading and singularly for a normal reading/recordation. Alternately two or more buttons can be provided, one for a calibration and a separate one for a normal reading/recordation. Other means of distinguishing the two type readings can be configured by one of skill in the art as directed by this specification.

As a further feature, a "cancellation" or a "go back" switch actuatable by a button or other device, can be provided on the stop 22 to "redo" a reading which, after recorded at the allocated memory location of the data storage device 30, is thereafter realized to be faulty or inaccurate. This is a convenience over having to delete the recorded data point at the location of the storage device 30 (by keyboard entry), which device 30 may be located remotely from the actual site of taper gauge measuring. For example, a machinist making measurements on a turbine in a power plant need not be required to leave an elevated working platform to delete an erroneous reading at the data storage device 30 which may be located on ground level. To be able to conveniently "go back" to redo an erroneous reading locally at the button of the taper gauge, can possibly save many wasted and inefficient man hours. Also, instead of a separate "go back" button the single or plural button 70 can be used in a coordinated, coded fashion to accomplish the "go back" function, as can be designed by one of skill in the art directed by this specification.

Although a button 70 or a plurality of buttons are described to instigate calibration, or normal reading and recordation, or the "go back" function, other type switches are encompassed by the invention such as a squeeze type switch, toggle switch, a touch type membrane switch, other touch type switches, etc. and are encompassed by the invention.

The stop 22 can alternatively be provided with a contact switch which is triggered, not by a manual action of a button, but by contact of the stopper 22 or finger 44 with the object 38 adjacent the gap to be measured. Also, the manual switches can alternately be located on the conversion device 26, particularly if this device is located close to the taper gauge 20.

Since the first signal sent from the reading device 64 along the transmission arrangement 28 is indicative only of the position of the stop member 22 relative to the taper gauge 20, this read information does not provide the user of the taper gauge with the desired information, which is the thickness of the taper gauge at the point where the stop member is stopped. Therefore the conversion device 26 is provided to convert this first signal into a signal indicative of the thickness based upon the read position of the stop member so that the second signal will be indicative of the thickness and thus the desired dimension.

Although a separate conversion device 26 is described to convert the first signal into the second signal, it is possible to precalibrate the reading device 64 and the information area 24 for the particular taper gauge 20 such that the first signal is pre-converted by the reading device 64 and the information area 24, and does represent a thickness signal directly, eliminating the need for a separate conversion device. Alternately, the conversion device 26 can be eliminated and its function, mathematical conversion, can be performed by software in the computer/data storage device 30.

Figure 8:
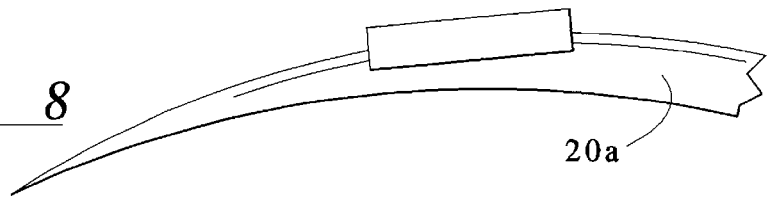
FIG. 8 is a side elevational view of an alternative embodiment of the taper gauge.

The taper gauge 20 may be straight along its length, or may be curved in the event that the gap to be measured represents a curved gap, such as that often found in the area of rotors and other structures found in motors, turbines, etc. FIG. 8 illustrates a curved tapered gauge in which the radial thickness as viewed along a radius line defining the radius of curvature of the taper gauge diminishes along its length. FIGS. 9 and 10 illustrate an arrangement where the taper gauge 20(b) has a radius of curvature, but the thickness remains constant in the radial direction and diminishes in a direction perpendicular to the radial dimension. Similar mounting arrangements for the stop member and information area would be provided on these other types of taper gauges as well.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. An electronic taper gauge system comprising:
   a taper gauge having a diminishing profile in at least one lateral dimension along its length;
   a movable stop member carried on said taper gauge and movable along said length;
   a magnetic strip storing information thereon and positioned along at least a portion of said length;
   a reading device carried on said stop member to read said magnetic strip and to generate a first signal indicating a linear position of said movable stop member;
   an electronic conversion device for converting said first signal into a second signal indicating a lateral dimension of said taper gauge at a point dependent on a then current position of said stop member on said taper gauge; and
   a transmission arrangement for transmitting said first signal from said reading device to said conversion device.

2. An electronic taper gauge system according to claim 1, further including a data storage device for storing said second signal as data and a second transmission arrangement for transmitting said second signal to said data storage device.

3. An electronic taper gauge system according to claim 2, further including an actuatable switch for sending a third signal to effect a recording of at least one of said signals at said data storage device.

4. An electronic taper gauge system according to claim 1, wherein said taper gauge is curved along its length.

5. An electronic taper gauge system according to claim 1, wherein said taper gauge is straight along its length.

6. An electronic taper gauge system, comprising: an elongate member having a diminishing profile in at least one lateral dimension
   along its length to a free end; a movable stop member carried on said elongate member and movable along
   said length, said stop member having an abutting surface on a side nearest
   said free end; linear position information arranged along said elongate member which
   represents an insertion distance between said abutting surface and said free end; an electronic reading device carried on said stop member for reading said linear
   position information and generating an electronic taper signal from said
   linear position information; a data recording device; and a transmission device for transmitting said taper signal to said data recording device.

7. The system according to claim 6, further comprising a conversion device for converting said taper signal from a length signal representing said insertion distance into a lateral dimension signal by mathematically correlating said length signal to the diminishing profile of said elongate member.

8. The system according to claim 7, wherein said conversion device comprises software instructions provided by said data recording device.

9. The system according to claim 6, wherein said linear position information is stored on a magnetic strip.

10. The system according to claim 6, wherein said enlongate member is curved along its length.

11. The system according to claim 6, wherein said enlongate member is straight along its length.

12. The system according to claim 6, further comprising an actuatable switch mounted to said stop member, and a second transmission device connecting said switch to said data recording device, said actuatable switch for sending a recording signal to effect a recording of a thickness data point corresponding to said taper signal at an allocated memory location of said data recording device.

13. The system according to claim 12, further comprising an actuatable go back switch mounted on said elongate member and connected to said second transmission device and actuatable to electronically instruct said data recording device to re-record a thickness data point at said allocated memory location.

14. An electronic taper gauge system, comprising: an elongate member having a diminishing profile in at least one
   lateral dimension along its length toward a free end thereof, said free end for
   insertion into a gap to be measured, wherein the gap is defined between two objects; a magnetic strip on said
   elongate member for sensing an insertion distance between said free end and one of said objects adjacent said gap when said elongate member is fully inserted into said gap until said lateral dimension of said elongate member bridges said gap, said diminishing profile being pre-defined in mathematical corresponding relationship to said insertion distance, said magnetic strip generating a corresponding signal to said insertion distance; an electronic data read out device; and a transmission device for transmitting said corresponding signal to said read out device.

15. The system according to claim 14, wherein said elongate member further comprises a slidable stopper mounted slidably on said elongate member and abuttable to one of said objects of said gap to be measured, and a position sensor applied between said slidable stopper and said elongate member.

16. The system according to claim 14, wherein said read out device comprises a data recording device for storage of said corresponding signal.

17. The system according to claim 16, further comprising a manually actuatable switch connected to said means for sensing, said switch for causing said corresponding signal to be recorded as a data point allocated to a memory location in said data recording device.

18. The system according to claim 17, further comprising a go back switching means for re-recording said data point at said allocated memory location with a subsequent corresponding signal from said means for sensing, said go back switching means having a manual actuator located at said elongate member.

19. The system according to claim 14, further comprising a calibration block which includes a precision calibrated gap between two calibration edges; and said means for sensing further comprising a conversion device circuit for mathematically changing an insertion distance to a lateral dimension signal, said conversion device circuit calibrating the mathematical correspondence between insertion distance and lateral dimension by measuring an insertion distance into said precision calibrated gap.

20. The system according to claim 14, wherein said corresponding signal is an insertion distance signal, and further comprising a conversion device for mathematically changing said insertion distance signal to a lateral dimension signal, corresponding to a width of said gap, and said transmission device transmits said lateral dimension signal to said read out device.

* * * * *